F. C. SHEPARD.
VALVE LOCKING DEVICE.
APPLICATION FILED APR. 11, 1910.
1,003,211.
Patented Sept. 12, 1911.
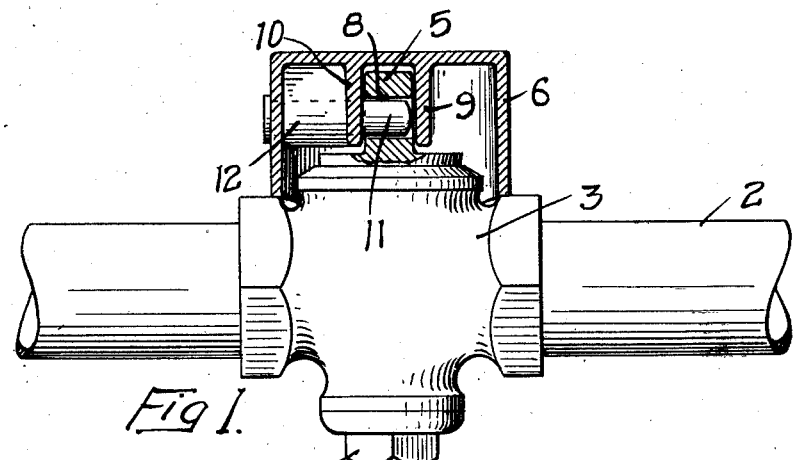
Fig 1.
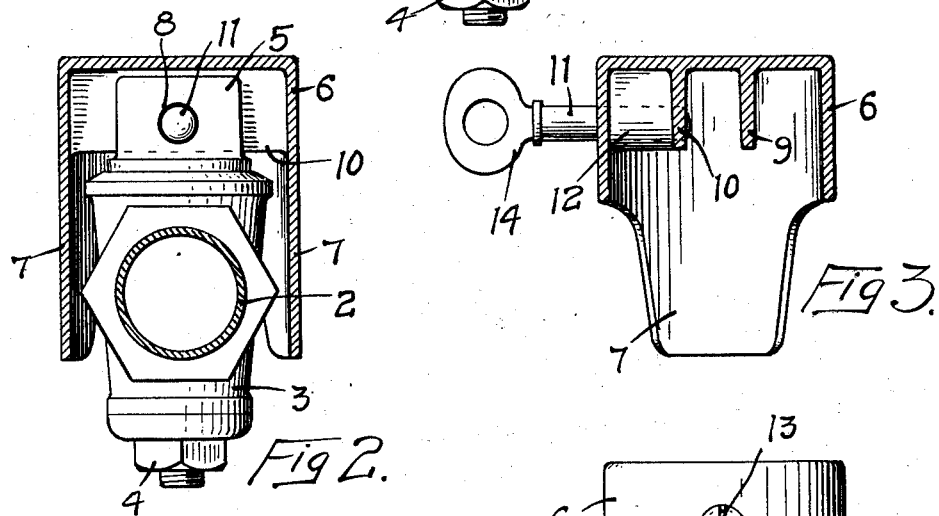
Fig 2.
Fig 3.
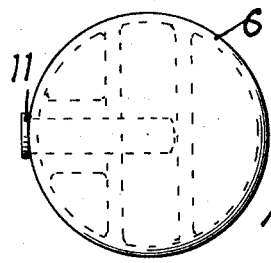
Fig 5.
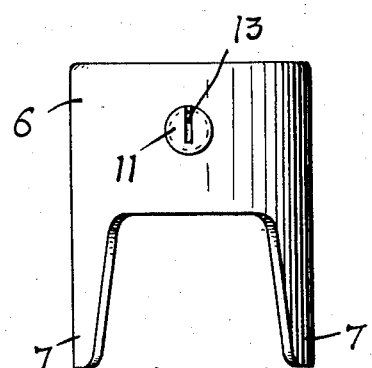
Fig 4.
WITNESSES
A. M. Walstrom
J. A. Byrnes
INVENTOR
FREDERICK C. SHEPARD
BY Paul & Paul
ATTORNEYS
COLUMBIA PLANOGRAPH CO., WASHINGTON, D. C.

UNITED STATES PATENT OFFICE.

FREDRICK C. SHEPARD, OF MINNEAPOLIS, MINNESOTA, ASSIGNOR OF ONE-HALF TO WILLIAM S. LEVINGS, OF MINNEAPOLIS, MINNESOTA.

VALVE-LOCKING DEVICE.

1,003,211.     Specification of Letters Patent.     Patented Sept. 12, 1911.

Application filed April 11, 1910. Serial No. 554,733.

*To all whom it may concern:*

Be it known that I, FREDRICK C. SHEPARD, of Minneapolis, Hennepin county, Minnesota, have invented certain new and useful Improvements in Valve-Locking Devices, of which the following is a specification.

The object of the invention is to provide a locking device for valves designated particularly for gas meter and service cocks and arranged to positively prevent the opening of the valve or cock by any unauthorized person.

A further object is to provide a locking device that is capable of application to a service or gas cock without any fitting, which is usually required where a locking device is applied to a valve.

The invention consists generally in various constructions and combinations, all as hereinafter described and particularly pointed out in the claims.

In the accompanying drawings forming part of this specification, Figure 1 is a side view of a meter or service cock illustrating the application of my invention thereto, Fig. 2 is an end view of the valve, Fig. 3 is a sectional view illustrating the construction of the locking device, Fig. 4 is a side view of the locking device, Fig. 5 is a plan view.

In the drawing, 2 represents a gas pipe, 3 the casing of a valve or cock, such as is usually employed between the gas main and the meter. As usual in valves of this kind, a plug is provided having a nut 4 at one end and a stem 5 at the other end, usually flattened to receive a wrench. In these valves as ordinarily constructed, there is nothing to prevent an unauthorized person from opening the valve when it is closed and thereby obtaining a supply of gas. To prevent anyone from tampering with the valve I provide a casing or hood 6 adapted to fit over the top of the valve and having depending wings 7 which extend down on each side of the valve casing 3 a sufficient distance to prevent the hood from being tilted or rotated sufficiently to expose the stem of the valve. The stem of the valve has a hole 8 therein, as usual in valves of this kind, and this hole I utilize as a socket for the locking bolt. It is not, therefore, necessary for the person applying the device to the valve to spend any time in fitting the hood thereon or making a socket for the bolt. Flanges 9 and 10 depend from the top of the hood, the space between the flanges being of sufficient width to receive the end of the stem in which the hole or socket is formed. A locking bolt 11 is mounted within an inclosure 12 in the hood and a key-hole 13 in the wall of the hood leads to a bolt actuating mechanism that receives a key 14, the bolt being projected by the inward thrust of the key. When the key is thrust into the lock and the bolt projected into the hole in the stem, the hood will be securely locked on the valve casing and it will be impossible for anyone to open the valve without breaking or otherwise damaging the inclosing hood.

I am aware that devices for this purpose have been heretofore used, but it has been necessary to either provide a valve of peculiar construction or else provide a casing of special form for each type of valve on which it is used.

With my invention the hood is applicable to any ordinary type of service or meter cock without any change and can be easily and quickly applied without removing the valve from its connections.

I claim as my invention:—

1. The combination, with a rotary valve having a stem provided with a transverse socket, of a hood adapted to fit over said stem and conceal the same, said hood having a wing adapted to extend down on the outside of the valve casing and contact therewith and prevent rotary movement of said hood, a locking bolt disposed within said hood and adapted to enter the socket in said stem, and mechanism within said hood and actuated by the movement of a key for projecting said bolt into said socket.

2. A locking device for service cocks comprising a metallic hood adapted to fit over the top of a valve and having depending wings on each side and lugs between which the stem of the valve is inserted, said stem having a hole therethrough, and a bolt mounted in said hood and adapted to be projected into said hole by the movement of a key.

3. A locking device for service cocks comprising a hood adapted to inclose the top of a valve and having wings to depend on each side thereof, the wall of said hood between said wings being adapted to rest on the casing of the valve, lugs depending within said hood and having a space between them to receive the stem of the valve, said stem having a socket therein, and a bolt carried by said hood and arranged to be projected into said socket by the movement of a key.

4. The combination, with a rotary valve having a stem provided with a transverse socket, of a hood adapted to fit over said stem and conceal the same and having depending wings adapted to extend down on each side of the valve casing and contact therewith and prevent rotary movement of said hood, said hood having a recess formed therein to receive said stem, the wall of said recess having a hole therein, a reciprocating bolt operating in said hole and adapted to enter a socket in said stem, and mechanism within said hood and actuated by the movement of a key for projecting said bolt or retracting the same.

5. A locking device for service cocks comprising a hood adapted to inclose the top of the valve and having wings to depend on each side thereof, the wall of said hood between said wings being adapted to rest on the casing of the valve, a lug depending within said hood and having an opening therein, a reciprocating bolt operating within said opening, mechanism actuated by the movement of the key disposed between said lug and the wall of said hood for projecting or retracting said bolt, and said valve having a stem provided with a socket to receive said bolt.

In witness whereof, I have hereunto set my hand this 7th day of April 1910.

FREDRICK C. SHEPARD.

Witnesses:
LILLIAN E. WILLIAMS,
GEO. N. DE MILLE.

Copies of this patent may be obtained for five cents each, by addressing the "Commissioner of Patents, Washington, D. C."